US 6,561,721 B2

(12) United States Patent
Lausch et al.

(10) Patent No.: US 6,561,721 B2
(45) Date of Patent: May 13, 2003

(54) CABLE BOLT WITH A YIELDING FIXTURE AND METHOD OF FORMING THE SAME

(75) Inventors: Peter Lausch, Kingston (CA); Andrew J. Hyett, Glenburnie (CA)

(73) Assignee: Mine Design Technologies Inc., Kingston (CA)

( * ) Notice: Subject to any disclaimer, the term of this patent is extended or adjusted under 35 U.S.C. 154(b) by 30 days.

(21) Appl. No.: 09/802,899

(22) Filed: Mar. 12, 2001

(65) Prior Publication Data

US 2001/0038779 A1 Nov. 8, 2001

(30) Foreign Application Priority Data

Mar. 15, 2000 (CA) ............................................. 2300742

(51) Int. Cl.$^7$ ............................................... F16G 11/00
(52) U.S. Cl. .................. 403/282; 405/259.1; 405/302.2
(58) Field of Search ................................ 403/274, 275, 403/276, 279, 282, 285; 405/259.1, 302.2

(56) References Cited

U.S. PATENT DOCUMENTS

| 4,043,690 A | 8/1977 | Browne |
| 4,279,531 A | 7/1981 | McKenzie |
| 4,845,814 A | 7/1989 | Crook |
| 5,152,630 A | 10/1992 | Walloch |
| 5,231,752 A | 8/1993 | Hereford |

*Primary Examiner*—Lynne H. Browne
*Assistant Examiner*—Jori Schiffman
(74) *Attorney, Agent, or Firm*—George J. Primak

(57) ABSTRACT

A cable bolt comprises a cable with a tubular yielding fixture at one of its ends. The pull-off load of such yielding fixture can be adjusted to a desired value. This is achieved by unwinding one end of the cable and inserting a slug over the kingwire. Then, the peripheral wires are wound again over the kingwire forming a bulge in the cable where the slug is located. The yielding fixture is then slid on the cable and forced over the bulged portion of the cable, while measuring the load required to achieve this operation, which also becomes the pull-off load of the yielding fixture. Finally, any part of the cable protruding from the fixture is cut-off to form the cable bolt with the desired yielding fixture at its end.

19 Claims, 6 Drawing Sheets

CABLE BOLT WITH A YIELDING FIXTURE AND METHOD OF FORMING THE SAME

BACKGROUND OF THE INVENTION

This invention relates to cable bolts used as ground support in mining and similar operations.

Cable bolt support is progressively gaining a higher proportion of the ground support market in Canada and elsewhere. This is principally due to (1) a cost/length which is comparable to rebar, (2) a 50–75% increase in weight-to-strength ratio compared to rebar, (3) high capacity (25 tonnes) compared to 150 kN for standard rebar and 10 tonnes for a mechanical rock bolt, (4) the versatility of cable bolts due to the fact that relatively long lengths can be coiled for installation from restricted access, and (5) the fact that high bond strength, comparable to rebar, can be developed using modified geometries such as the "bulge" cable and the "Garford bulb" cable.

The majority of cable bolts are grouted with a Type 10 Portland cement grout which does not attain full strength until 28 days. This has prevented the use of cable bolts as primary support at an advancing face. However, in U.S. coal mines, short lengths of cable are spun in a two-component epoxy-resin grout for primary roadway support. Also, application of epoxy grouted cables has been recently developed for specific hard-rock mining applications, such as ore-pass support. Ground Control Limited of Sudbury Canada is currently marketing a resin grouted cable bolt system called the Strandloc™ bolt. For this system, a threaded fixture is swaged onto the cable to facilitate mixing of the epoxy using a drill. However, tests indicate that this fixture will pull off the cable at 2–3 tonnes, and hence will do little more than hold the screen in place. As a result, to mobilize the full capacity of the cable (25 tonnes) the bolt must be full-column grouted, as opposed to toe-grouted, which becomes expensive for longer lengths.

OBJECTS AND SUMMARY OF THE INVENTION

It is an object of the present invention to obviate the above mentioned disadvantage and to provide a yielding fixture capable of mobilizing substantially full bolt capacity, even with toe-grouted cable bolts.

Another object of the present invention is to produce a yielding fixture attachment to the cable bolt which will have a predetermined pull-off load that may be either constant or variable.

Other objects and advantages of the present invention will be apparent from the following description thereof.

In essence, the present invention concerns a cable bolt having a cable and a yielding fixture at one of its ends, said yielding fixture being tubular and being attached to the cable by providing an insert of a predetermined size within a portion of the cable at a predetermined distance from an end of the cable, thereby forming a bulge in said portion of the cable, and forcing the portion of the cable with the bulge into the tubular yielding fixture so as to achieve a predetermined pull-off load of the yielding fixture. The tubular yielding fixture may be provided with means that will cooperate with a drill or other suitable device to permit spinning of the cable into a grouted hole in the ground which is being supported by said cable. The bulge near the end of the cable can be produced by inserting a suitable element within the structure of the cable by unwinding the end of the cable, placing the element within the structure of the cable and then rewinding the wires of the cable over the element, thereby producing the bulge. The preferred type of element is a slug that can be placed, for example, over the kingwire of the cable with the peripheral wires then being wrapped around the slug, thereby forming the bulge.

According to a preferred embodiment, the present invention involves a cable bolt having a 7-strand cable made of six peripheral wires wound around a middle wire or kingwire and having at one of its ends a tubular yielding fixture attached thereto so as to achieve a predetermined pull-off load. Such tubular yielding fixture may, for example, be a metal tube with a threaded portion at its end and including a nut that can be screwed onto the threaded end of the fixture. In lieu of the threaded portion, the metal tube may be provided at its end with means that would cooperate with a drill or similar device that would be used to rotate the tubular fixture so that the cable attached thereto can be spun when it is inserted into the grouted hole in the rock or ground being supported. Such means at the end of the tube could be a nut welded to the end of the tube or a flattened machined portion that would fit into the head cavity of a drill or otherwise used to spin the cable within the grouted hole. The attachment of the tube to the cable is preferably done in accordance with the present invention by unwrapping the wires at one end of the cable, placing a slug over the kingwire at a predetermined distance from the end of the cable, and then rewrapping the peripheral wires around the slug and the kingwire, thereby forming an enlarged diameter portion or bulge in the cable, and then forcing the end of the cable with the bulge into the tube so as to compress the slug within the bulge and thereby obtain a yielding fixture with a predetermined pull-off load based on the length and thickness of the slug employed. Different sizes, i.e. lengths and thicknesses, of slugs give different pull-off loads that can be measured, for instance with a load cell or similar device used during the insertion of the bulged cable into the tube. Also, such cable bolts can be instrumented with stress measuring rock support devices such as disclosed, for instance, in U.S. Pat. No. 5,929,341, to provide measurement of stress or strain in the ground being supported.

In accordance with the present invention, the method of forming a cable bolt with a tubular yielding fixture attached to an end of a cable, comprises providing an insert of a predetermined size within a portion of the cables at a predetermined distance from the end of the cable, so as to form a bulge in said portion of the cable, and forcing the portion of the cable with the bulge into the tubular fixture so as to achieve a predetermined pull-off load of the yielding fixture.

According to a more specific and preferred embodiment, the method comprises:

(a) spinning-open one end of a 7-strand cable by twisting the peripheral wires in a direction opposite to their inherent helical wrap and unwinding the peripheral wires until a portion of the kingwire is revealed and is followed by a small protuberance formed by the peripheral wires expanding over the kingwire;

(b) placing a slug, e.g. a slug made of mild steel, having a predetermined size and thickness, over the kingwire and sliding it so that it penetrates into the protuberance;

(c) winding the peripheral wires back to their original state with the slug remaining within the protuberance where it becomes enclosed, thereby making the cable diameter to be slightly larger in that portion of the cable, and forming a bulge near the end of the cable;

(d) sliding over the cable a tubular yielding fixture through its sleeve, (e.g. a steel tube with a threaded portion or with a welded nut or the like at its outer end) from the opposite end of the cable, so that the outer end of the fixture (with the threaded portion or the welded nut or the like) is up-front, and moving it until the outer end of the fixture comes into contact with the bulge in the cable where the slug is enclosed, over which it can no longer slide;

(e) forcing the tubular yielding fixture over the bulge in the cable, for example by clamping the fixture and pulling the portion with the bulge into the sleeve of the fixture, while measuring the load required to pull the portion of the cable with the bulge fully into the sleeve, which becomes the pull-off load of the yielding fixture; and, if necessary, (f) cutting off any part of the cable protruding from the outer end of the yielding fixture.

BRIEF DESCRIPTION OF THE DRAWINGS

The invention will further be described with reference to the accompanying drawings, in which.

DETAILED DESCRIPTION OF THE INVENTION

Figure 1:
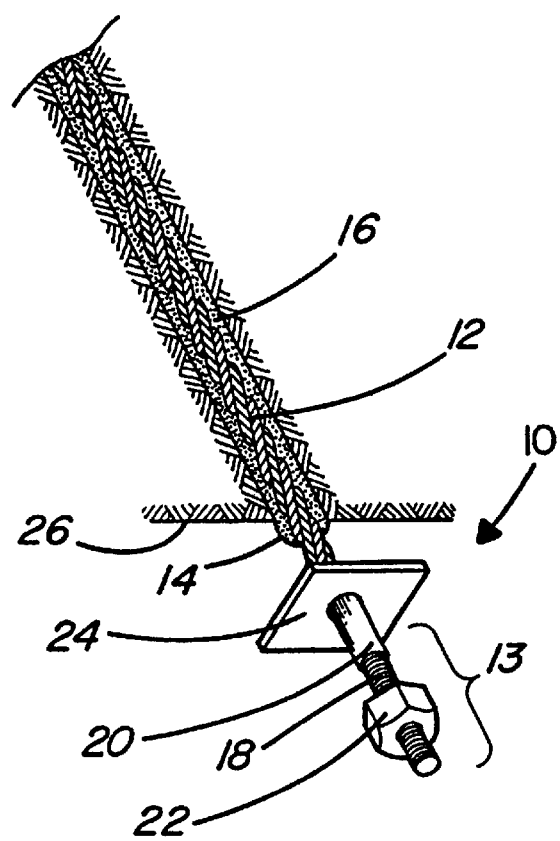
FIG. 1 shows a perspective view of a typical cable bolt placed in a rock hole according to the prior art.

In the drawings which illustrate a preferred but non-limitative embodiment of the invention, the same elements are identified by the same reference numbers in all the figures.

FIG. 1 illustrates a prior art cable bolt 10, the cable part 12 of which is inserted into a hole 14 formed in the rock and is grouted therein with grout 16. The threaded portion 18 of the outer end 13 of the cable bolt is usually swaged to the cable portion 12 by means of an intermediary collar 20. This could be done, for instance, as set out in U.S. Pat. No. 5,231,752 of Aug. 3, 1993 which also provides an insertion of a plug at the very end of the cable to strengthen the hold produced by swaging. Nut 22 is screwed onto the threaded portion 18 of the bolt and is used to spin the cable 12 in the grouted hole 14 and also to hold faceplate 24 against the rockface 26. Normally there is a screen provided between the rockface 26 and the faceplate 24 which is held in place by a plurality of such cable bolts 10 to prevent rock fall in a mine, for example.

Figure 2:
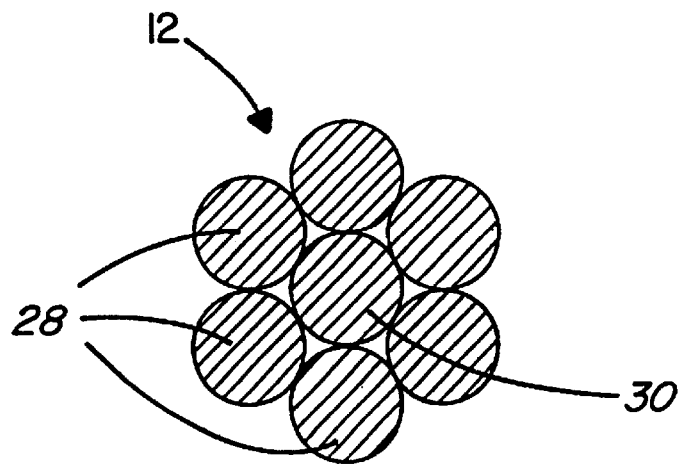
FIG. 2 is a cross-sectional view of a typical 7-strand cable used for a cable bolt.

The cable 12 used in such cable bolts and also for the purposes of the present invention, is illustrated in cross-section in FIG. 2. It is normally a steel cable that has six peripheral wires 28 wound about the central or kingwire 30 and which can mobilize a full capacity of about 25 tonnes. As already mentioned previously, the swaging of a bolt fixture onto the end of such cable produces a pull-off strength of only about 2–3 tonnes, which is clearly unsatisfactory. Other types of cables have been tried for cable bolt application and they can also be used within the scope of the present invention.

Figure 3:
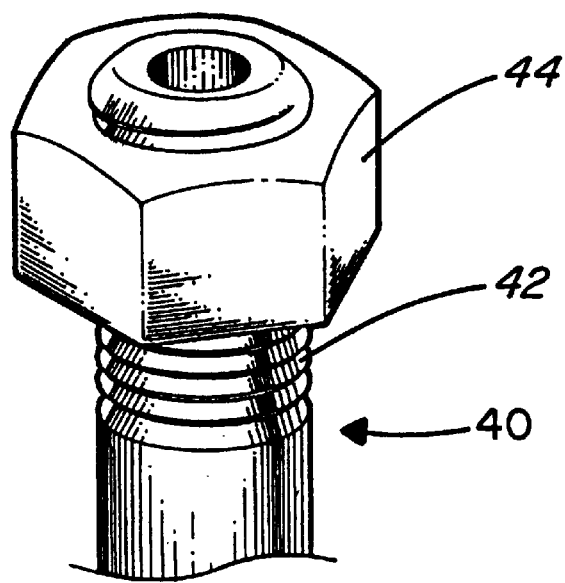
FIG. 3 is a perspective view of a tubular yielding fixture in accordance with the present invention.

FIG. 3 illustrates one embodiment of a tubular yielding fixture that can be used in accordance with the present invention. It shows the outer end of the tubular fixture 40 having a threaded portion 42 with nut 44 screwed thereon.

Figure 4:
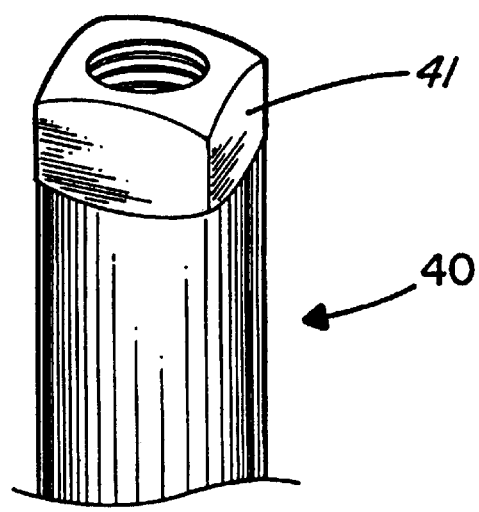
FIG. 4 is a perspective view of another type of tubular yielding fixture in accordance with the present invention.

FIG. 4 illustrates another embodiment of a tubular yielding fixture that can be used in accordance with the present invention: It shows an outer end of the fixture 40 which has a nut 41 welded to its end This nut 41 is different from the nut 44 screwed on the threaded portion 42 of the fixture shown in FIG. 3, because in this embodiment it merely serves to provide a square area that will fit into a drill-head cavity so that fixture 40 and the cable 12 attached thereto (as shown in FIG. 1) can be spun in the hole 14 provided with grout 16. Nut 41 can be welded to the end of tubular fixture 40 either before or after attachment of this fixture to the cable 12. Also it can be replaced by other types of nuts that would cooperate with appropriate cable spinning devices. Moreover, it may be eliminated by simply machining the outer end of the tubular fixture 40 to provide it with a desired configuration.

Figure 5:
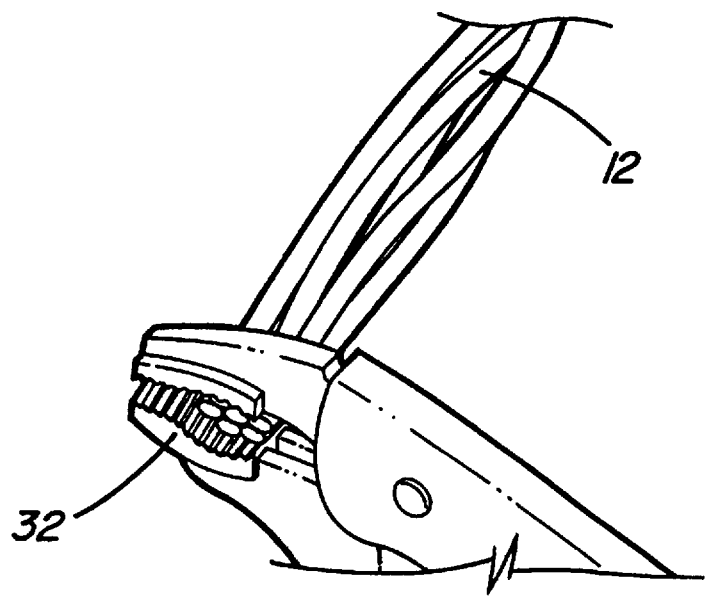
FIG. 5 is a perspective view showing the start of the unwinding step of the end of the cable pursuant to the method of the present invention.
Figure 6:
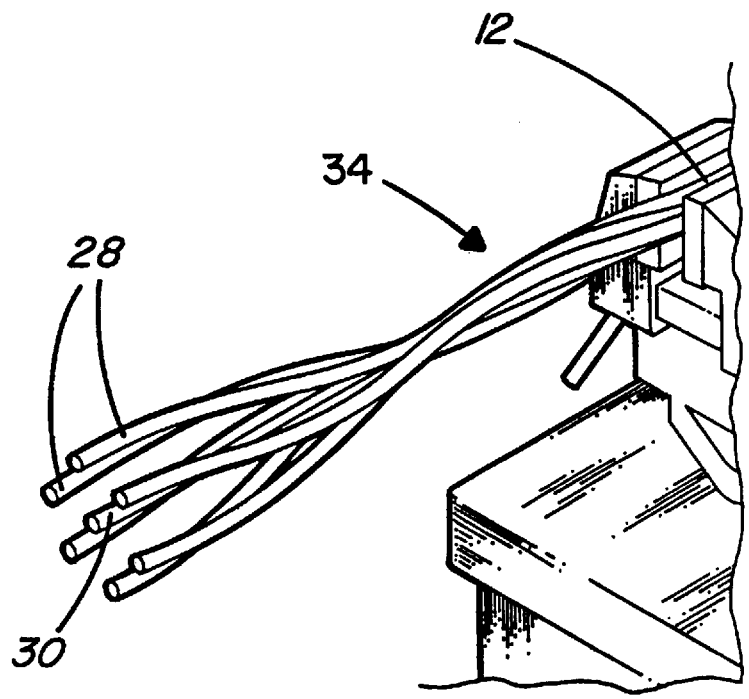
FIG. 6 is a perspective view showing the unwound end of the cable performed in accordance with the present invention.
Figure 11:
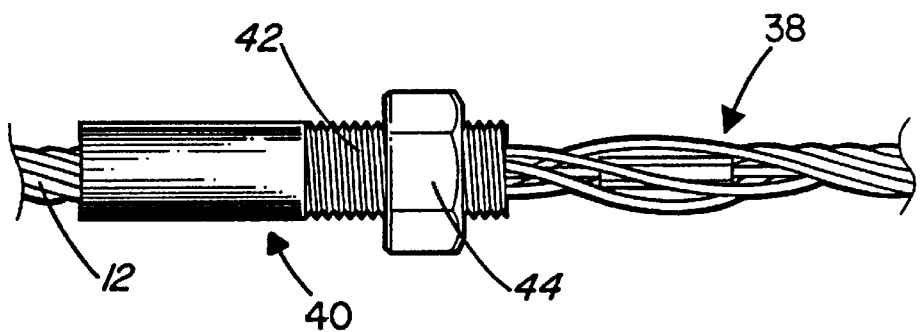
FIG. 11 is a side view of the same yielding fixture as shown in FIG. 10, but wherein a nut has been screwed onto the threaded portion of the fixture.
Figure 12:
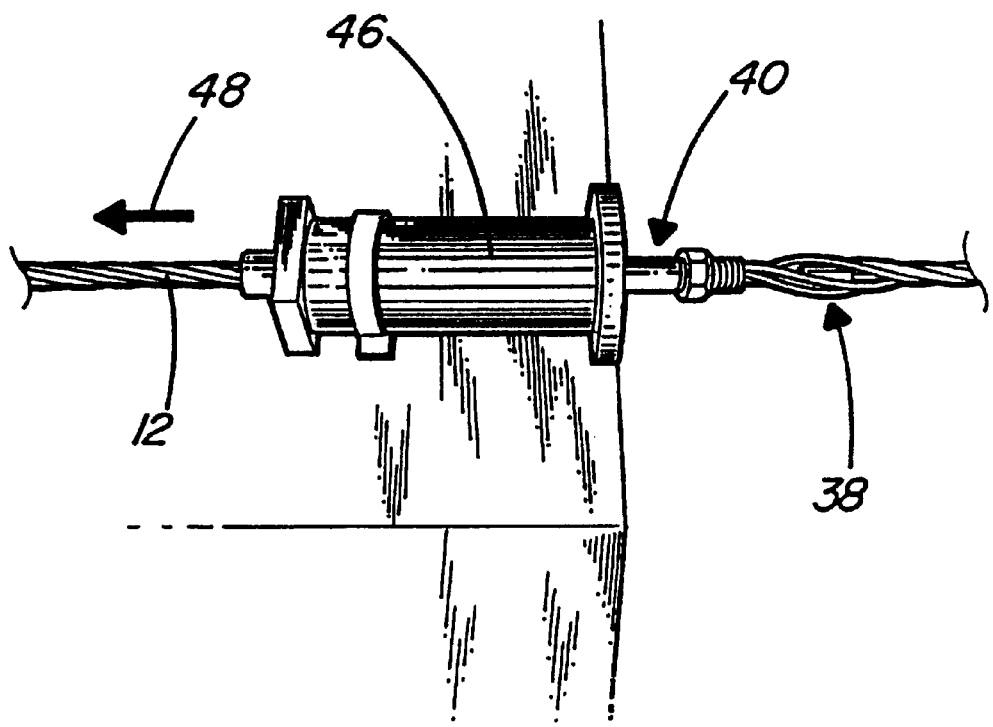
FIG. 12 is a view of a hydraulic ram arrangement clamping the yielding fixture which allows the cable to be pulled so that the portion with the bulge is forced into the sleeve of the yielding fixture.
Figure 13:
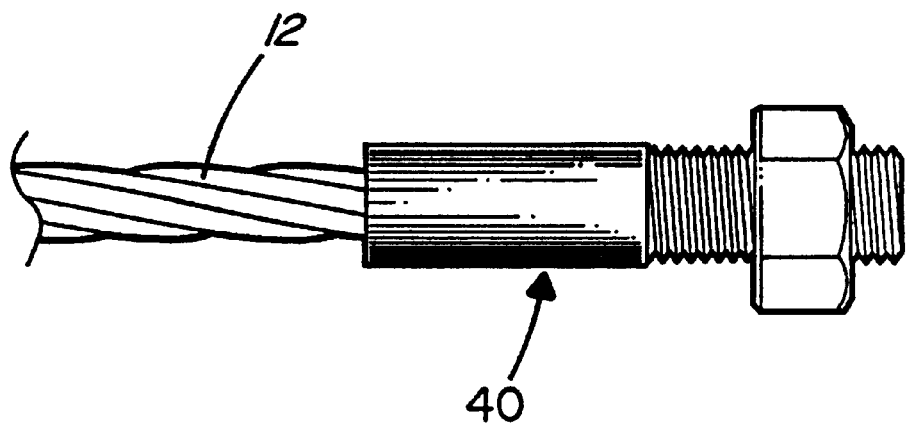
FIG. 13 is a side view of the final cable bolt according to the present invention produced after cutting off any portion of the cable protruding from the outer end of the fixture.

FIGS. 5 to 12 illustrate the various steps of the method of the present invention which constitutes a preferred embodiment for producing the cable bolt shown in FIG. 13. Thus, as shown in FIG. 5, a vice grip 32 can be used to initiate the unwinding process of the end of cable 12 by twisting said end in the direction opposite to the original twist of the cable. Once such initial loosening of the cable end is achieved, the cable is further untwisted as shown in FIG. 6 to reveal the kingwire 30 in the middle of the spread of peripheral wires 28, and to form a protuberance 34 that follows the unwrap of the wires at the outer end of the cable 12. This unwrap or flare-open of the wires of the cable occurs over approximately the first 12 inches (30 cm) from the end of the cable, which herein is called the "outer end" of the cable, and the middle of the bulge 34 normally occurs about 18 inches (45 cm) from this outer end of the cable 12.

Figure 7:
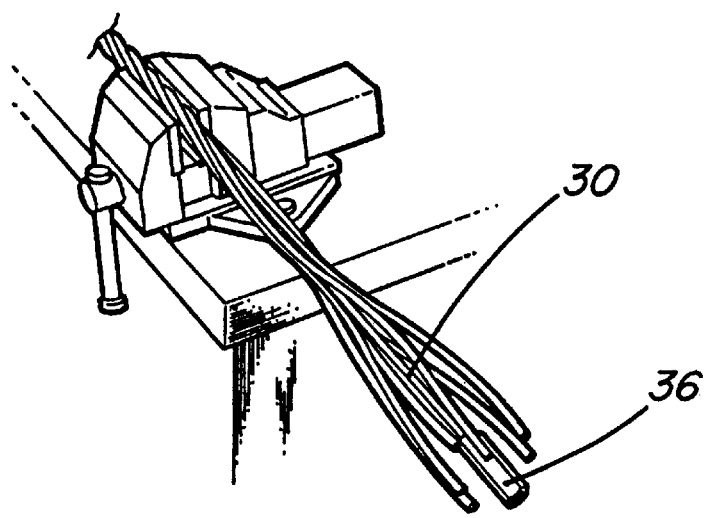
FIG. 7 is a perspective view showing the placing of a slug over the kingwire of the cable unwound as per FIG. 6.

FIG. 7 illustrates the placing of a slug 36 which is normally a tube made of mild steel and having an internal cavity that fits over the kingwire 30 and enables the slug 36 to slide over the kingwire 30. The wall thickness and the length of the slug 36 can be adjusted to obtain a predetermined yielding force. For example, the load capacity of the fixture can be varied by varying the length of the slug. Thus, by providing standard fixtures and slugs of various lengths, it is possible to meet the needs of various mining operations without having a large stock of different pieces.

Figure 8:
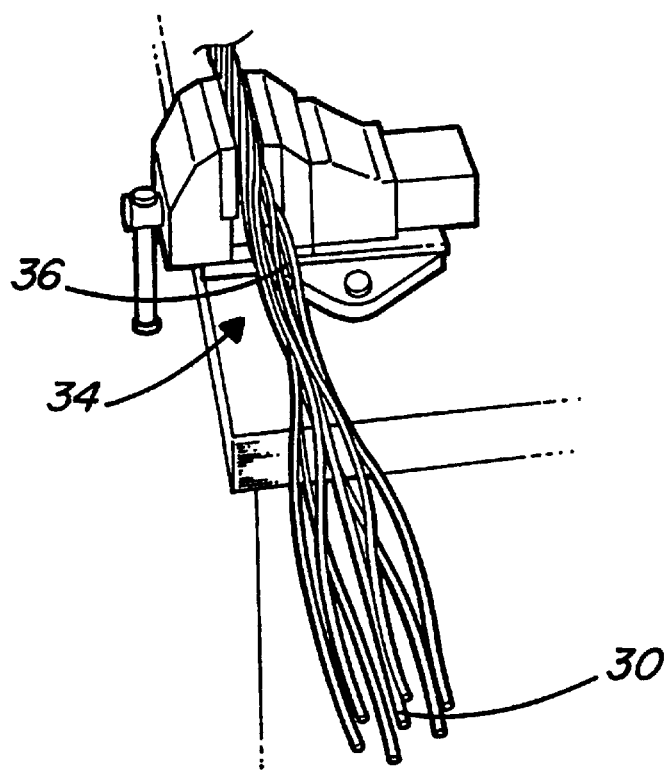
FIG. 8 is a perspective view showing the insertion of the slug into the protuberance formed in the cable unwound as per FIG. 6.
Figure 9:
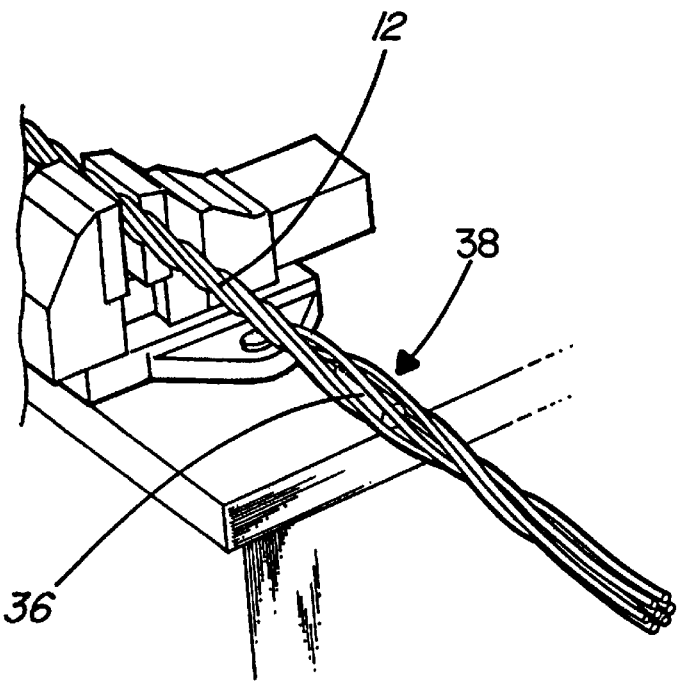
FIG. 9 is a perspective view showing the winding of the peripheral wires back into their original state.

As shown in FIG. 8, slug 36 is slid over the kingwire 30 until it penetrates into and is enclosed within the protuberance 34 that was produced during the unwinding operation. Thereafter, as shown in FIG. 9, cable 12 is rewound essentially into its original condition, but producing an enlarged diameter portion or bulge 38 where the slug 36 is enclosed.

Figure 10:
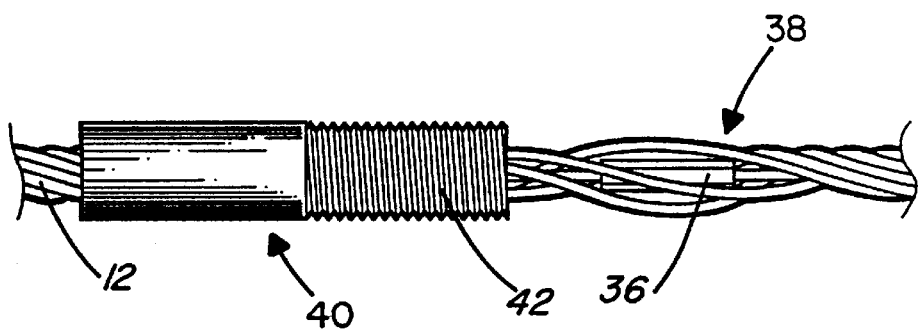
FIG. 10 is a side view of the yielding fixture slid on the cable from the opposite end and stopped by the bulge in the cable caused by the presence of the slug.

FIG. 10 shows the tubular yielding fixture 40 that has a threaded portion 42 at its outer end and the sleeve of which has been inserted from the opposite or back end of the cable 12 and slid on the cable up to the point where the outer end of the threaded portion 42 can no longer advance because of the bulge 38 of the cable where the slug 36 is located. In this example, the threaded tube representing the yielding fixture 40 is constructed of tempered steel and has an inside diameter of 0.642 inches (16 mm) and an outside diameter of 1.25 inches (31.25 mm). The length of the tube used for this embodiment was 6 inches (15 cm), but it can be of any desired length that would accommodate bulge 38. At this stage, as shown in FIG. 11, a nut 44 normally made of hardened steel and sized to be screwed onto the threaded portion 42 of the yielding fixture 40 is screwed onto said threaded portion 42, completing the arrangement. If desired, the nut 44 can be screwed onto the threaded portion 42 prior to sliding the yielding fixture 40 on cable 12 from the back end of the cable.

Then, as shown in FIG. 12, a hydraulic ram 46 is installed so as to clamp the yielding fixture 40 and the cable 12 is pulled in the direction shown by arrow 48, thereby forcing the bulge 38 of the cable into the sleeve of the yielding fixture 40 until said portion, with the slug 36 therein, is fully inserted in said fixture 40. The load required to achieve this pull is measured, for example, by means of a load cell, and once the bulge 38 becomes fully inserted within the sleeve of the fixture 40, the load becomes relatively constant. In fact, by adjusting the shape and size of the slug 36, one can achieve a desired predetermined yield or load for the yielding fixture that may be constant or variable as desired and which can mobilize close to the full capacity of the cable. When variable or increasing load carrying capacity is desired, the external diameter of the fixture 40 is varied so that, as the bulge 38 is pulled through the fixture, there is an increasing radial confinement. This increase in radial confinement will result in ever increasing load resistance when the slug is pulled through the fixture. The increase in the fixture thickness can be gradual or stepwise. The circumstances for requiring variable load capacity depend on the nature of the ground that is being controlled with the fixture. In a seismically active area, a mine would want a support system that offers increasing support capacity should ground movement occur and it is in such circumstances that a variable load fixture may be used.

Finally, once the bulge 38 has been fully inserted into the sleeve of the yielding fixture 40, the protruding front end of the cable is normally cut off to obtain the cable bolt shown in FIG. 13, with a yielding fixture 40 attached to the cable 12 at its end.

Although the invention has been described with reference to a preferred embodiment, it should be noted that many modifications obvious to those skilled in the art can be made without departing from the spirit of the invention and the scope of the following claims. For instance, the various steps described above could be automated; also the forcing of the portion of the cable with the bulge into the sleeve of the yielding fixture could be accomplished differently with different equipment. The tubular yielding fixture can also be made of various shapes and sizes, with or without a threaded portion at its end. As already mentioned, such cable bolts can be instrumented to provide measurement of stress or strain in the ground being supported.

What is claimed is:

1. A cable bolt with a preset load capacity including a cable adapted to be inserted into a hole formed in a rock, with an outer end of said cable being outside the hole when said cable is in the hole; said cable having an insert of a predetermined size mounted within the cable so as to form a bulge in the cable at a predetermined distance from the outer end of the cable, but without extending to the outer end of the cable, and a tubular yielding fixture provided over the bulge by forcing the bulge into said fixture so as to compress the insert within the cable to the extent required to achieve a predetermined pull-off load of the yielding fixture corresponding to the preset load capacity of the cable bolt.

2. A cable bolt according to claim 1, in which the tubular yielding fixture has a threaded portion at its outer end.

3. A cable bolt according to claim 1, in which the tubular yielding fixture is formed at its outer end so that it may cooperate with a drill or similar device to spin the cable attached thereto.

4. A cable bolt according to claim 2, in which a nut is screwed on to the threaded portion of the tubular yielding fixture.

5. A cable bolt according to claim 3, in which a nut is welded to the outer end of the tubular yielding fixture.

6. A cable bolt according to claim 1, in which the cable is a 7-strand cable composed of six peripheral wires wound around a kingwire.

7. A cable bolt according to claim 6, in which the bulge at the end of the cable is formed by providing a slug over the kingwire at a predetermined distance from the end of the cable.

8. A cable bolt according to claim 7, in which the predetermined pull-off load is achieved by a selection of length or thickness or length and thickness of the slug.

9. A cable bolt according to claim 7, in which the slug is made of mild steel.

10. A cable bolt according to claim 1, which is instrumented to provide measurement of stress or strain in supported ground.

11. A method of forming a cable bolt with a preset load capacity, which comprises: providing a cable adapted to be inserted into a hole formed in a rock, with an outer end of said cable being outside the hole when said cable is in the hole; providing an insert within the cable so as to form a bulge in the cable at a predetermined distance from the outer end of the cable, but without extending to the outer end of the cable; providing a tubular yielding fixture having an internal diameter smaller than the bulge and forcing the bulge into the tubular yielding fixture so as to compress the insert within the cable to the extent required to achieve a predetermined pull-off load of the yielding fixture corresponding to the preset load capacity of the cable bolt.

12. A method according to claim 11, further comprising measuring the force required to force the portion of the cable with the bulge into the tubular yielding fixture which corresponds to the pull-off load.

13. A method according to claim 11, in which the cable is a 7-strand cable composed of six peripheral wires wound around a kingwire, and in which the insert is a slug placed on the kingwire after unwinding the peripheral wires at the end of the cable and then rewinding them over the slug to form the bulge in the cable.

14. A method according to claim 13, in which said slug is adjusted in length or thickness or length and thickness so as to obtain a desired pull-off load of the yielding fixture.

15. A method according to claim 11, in which the forcing of the portion of the cable with the bulge into the tubular yielding fixture is achieved by clamping said yielding fixture and pulling the cable with the bulge thereinto by applying sufficient pulling force to the cable.

16. A method according to claim 11, further comprising cutting-off any part of the cable protruding out of the end of the tubular yielding fixture.

17. A cable bolt with a variable load capacity including a cable adapted to be inserted into a hole formed in a rock, with an outer end of said cable being outside the hole when said cable is in the hole, said cable having an insert of a predetermined size mouted within the cable so as to form a bulge in the cable at a predetermined distance from the outer end of the cable, but without extending to the outer end of the cable; and a tubular yielding fixture provided over the bulge and compressing the insert within the cable to a predetermined pull-off load, said tubular yielding fixture having an internal diameter such that an increasing radial confinement is produced as the bulge is pulled through the fixture.

18. A cable bolt according to claim 17, in which the increasing radial confinement is gradual.

19. A cable bolt according to claim 17, in which the increasing radial confinement is stepwise.

* * * * *